US010122803B2

(12) United States Patent
Luo et al.

(10) Patent No.: US 10,122,803 B2
(45) Date of Patent: Nov. 6, 2018

(54) NETWORK DATA TRANSMISSION METHOD, DEVICE AND SYSTEM

(71) Applicant: UC MOBILE CO., LTD., Beijing (CN)

(72) Inventors: Wenping Luo, Guangdong (CN); Weiran Jiang, Guangdong (CN)

(73) Assignee: UC Mobile Co., Ltd., Beijing (CN)

(*) Notice: Subject to any disclaimer, the term of this patent is extended or adjusted under 35 U.S.C. 154(b) by 265 days.

(21) Appl. No.: 15/187,526

(22) Filed: Jun. 20, 2016

(65) Prior Publication Data
US 2016/0301763 A1 Oct. 13, 2016

Related U.S. Application Data

(63) Continuation of application No. PCT/CN2014/078716, filed on May 28, 2014.

(30) Foreign Application Priority Data

Dec. 30, 2013 (CN) .......................... 2013 1 0744226

(51) Int. Cl.
H04L 29/08 (2006.01)
H04L 29/06 (2006.01)
(Continued)

(52) U.S. Cl.
CPC .............. H04L 67/18 (2013.01); H04L 29/06 (2013.01); H04L 41/048 (2013.01); H04L 67/02 (2013.01); H04L 69/04 (2013.01); H04L 45/44 (2013.01)

(58) Field of Classification Search
CPC ... H04L 29/06; H04L 29/08072; H04L 45/42; H04L 45/44; G06F 15/16
(Continued)

(56) References Cited

U.S. PATENT DOCUMENTS 7,657,573 B1 * 2/2010 Hancsarik ............... G06F 9/541
707/809
7,689,611 B2 3/2010 Watanabe
(Continued)

FOREIGN PATENT DOCUMENTS

CN 101237419 8/2008
CN 102006295 4/2011
(Continued)

OTHER PUBLICATIONS

Third Notice issued by China State Intellectual Property Office, dated Apr. 26, 2017 for Chinese Patent Application No. 201310744226.8.

(Continued)

Primary Examiner — Khanh Dinh
(74) Attorney, Agent, or Firm — Sheppard, Mullin, Richter & Hampton LLP

(57) ABSTRACT

A network data transmission method includes: acquiring a network request generated by a client terminal; comparing the network request with a pre-stored network request template to obtain discrepant data and identical data; determining position information of the discrepant data and the identical data in the network request template; and transmitting to a server identification information of the network request template, the discrepant data and the position information, where the identification information will be used to determine the network request template for the server, and the network request template, the discrepant data and the position information will be used to restore the network request for the server.

18 Claims, 14 Drawing Sheets

(51) Int. Cl.
*H04L 12/24* (2006.01)
*H04L 12/721* (2013.01)

(58) Field of Classification Search
USPC .................. 709/220, 224, 226, 228; 370/474
See application file for complete search history.

(56) References Cited

U.S. PATENT DOCUMENTS

| | | | |
|---|---|---|---|
| 7,831,968 B1 * | 11/2010 | Weathersby | G06F 8/60 |
| | | | 717/174 |
| 8,484,156 B2 * | 7/2013 | Hancsarik | G06F 9/544 |
| | | | 707/602 |
| 8,503,305 B2 * | 8/2013 | Porat | H04L 45/02 |
| | | | 370/236 |
| 9,451,302 B2 * | 9/2016 | Huang | H04N 21/2393 |
| 2005/0251517 A1 | 11/2005 | Wantanabe et al. | |
| 2008/0046433 A1 * | 2/2008 | Kool-Brown | G06F 17/30867 |
| 2010/0002722 A1 * | 1/2010 | Porat | H04L 45/02 |
| | | | 370/467 |
| 2010/0091799 A1 * | 4/2010 | Hancsarik | G06F 9/541 |
| | | | 370/474 |

FOREIGN PATENT DOCUMENTS

| | | |
|---|---|---|
| CN | 102118293 A | 7/2011 |
| CN | 102118792 | 7/2011 |
| CN | 102739703 A | 10/2012 |
| CN | 102761861 A | 10/2012 |
| CN | 103731424 A | 4/2014 |

OTHER PUBLICATIONS

International Search Report and Written Opinion for PCT/CN2014/078716, dated Oct. 10, 2014, 26 pages.
International Written Opinion for PCT/CN2014/078716, dated Oct. 10, 2014.
International Preliminary Report on Patentability for PCT/CN2014/078716, dated Jul. 5, 2016, 12 pages.
First Notice issued by China State Intellectual Property Office, dated May 31, 2016 for Chinese Patent Application No. 201310744226.8 with search report.
Second Notice issued by China State Intellectual Property Office, dated Oct. 31, 2016 for Chinese Patent Application No. 201310744226.8.

* cited by examiner

NETWORK DATA TRANSMISSION METHOD, DEVICE AND SYSTEM

CROSS-REFERENCE TO RELATED APPLICATIONS

This application is a continuation application of International Application No. PCT/CN2014/078716, filed May 28, 2014, which is based upon and claims priority to Chinese Patent Application No. 201310744226.8, filed Dec. 30, 2013. The entire contents of the above referenced applications are incorporated herein by reference.

TECHNICAL FIELD

The present invention relates to the field of network communication technologies, and more particularly, to a network data transmission method, device and system.

RELATED ART

At present, in a network transmission process, after a client terminal and a server establish a connection of transport layer, the client terminal can initiate a network request to the server; if the server receives the network request transmitted by the client terminal, the server would feed back to the client terminal information corresponding to the network request.

Each network request transmitted by the client terminal to the server may generally contain some fixed information, for example, User Agent, Accept and other fields. In different network requests, sometimes, the fixed information is the same contents. As the network request transmitted by the client terminal to the server contains a significant amount of repeated contents, this not only wastes the data traffic of the client terminal but also extends the time to transmit the network request to the server by the client terminal, thus reducing the speed at which the client terminal accesses the network.

Therefore, how to increase the speed at which the client terminal accesses the network becomes a technical problem to be urgently solved at present.

SUMMARY OF THE INVENTION

Embodiments of the present invention provide a network data transmission method, device and system, to avoid wasting the data traffic of the client terminal and reduce the time to transmit the network request to the server by the client terminal, thus improving the speed at which the client terminal accesses the network.

The embodiments of the present invention are implemented as follows:

A network data transmission method includes: acquiring a network request; comparing the network request with a network request template pre-stored on a client terminal to obtain discrepant data and identical data; determining position information of the discrepant data and the identical data in the network request template; and transmitting to a server identification information of the network request template, the discrepant data and the position information, where the identification information will be used to search for, by the server, the network request template pre-stored on the server and corresponding to the identification information, and the network request template, the discrepant data and the position information will be used to restore, by the server, the network request.

A network data transmission method includes: receiving identification information of a network request template, discrepant data and position information transmitted by a client terminal, wherein the discrepant data and identical data are obtained by the client terminal after comparing an acquired network request with the network request template stored therein, and the position information is determined by the client terminal according to positions of the discrepant data and the identical data in the network request template; searching for the network request template corresponding to the identification information; and restoring the network request according to the network request template, the discrepant data and the position information.

A network data transmission device includes: an acquisition module configured to acquire a network request; a comparison module configured to compare the network request with a network request template pre-stored on a client terminal to obtain discrepant data and identical data; a determination module configured to determine position information of the discrepant data and the identical data in the network request template; and a first transmission module configured to transmit to a server identification information of the network request template, the discrepant data and the position information, where the identification information will be used to search for, by the server, the network request template pre-stored on the server and corresponding to the identification information, and the network request template, the discrepant data and the position information will be used to restore, by the server, the network request.

A network data transmission device includes: a first receiving module configured to receive identification information of a network request template, discrepant data and position information transmitted by a client terminal, wherein the discrepant data and identical data are obtained by the client terminal after comparing an acquired network request with the network request template stored therein, and the position information is determined by the client terminal according to positions of the discrepant data and the identical data in the network request template; a searching module configured to search for the network request template corresponding to the identification information; and a restoration module configured to restore the network request according to the network request template, the discrepant data and the position information.

A network data transmission system includes a client terminal and a server; wherein the client terminal is configured to acquire a network request; compare the network request with a network request template pre-stored on the client terminal to obtain discrepant data and identical data; determine position information of the discrepant data and the identical data in the network request template; and transmit to a server identification information of the network request template, the discrepant data and the position information; and the server is configured to receive the identification information of the network request template, the discrepant data and the position information transmitted by the client terminal; search for the network request template corresponding to the identification information; and restore the network request according to the network request template, the discrepant data and the position information.

Compared with the prior art, the technical solutions provided in the embodiments have the following advantages and characteristics:

In the solutions according to the present invention, data transmitted to a server by a client terminal includes identification information of a network request template, discrepant data and position information, and as the data transmitted to the server by the client terminal does not include identical data of a network request and the network request template, a significant amount of repeated contents are reduced, thus reducing transmission of network data; moreover, after receiving the data transmitted by the client terminal, the server can restore the network request by using the network request template, the discrepant data and the position information, thus ensuring correctness of the transmission of network data. Therefore, the solutions according to the present invention reduce the time to transmit a network request to the server by the client terminal while ensuring proper transmission of network data, thus improving the speed at which the client terminal accesses the network.

BRIEF DESCRIPTION OF THE DRAWINGS

To illustrate the technical solutions according to the embodiments of the present invention or in the prior art more clearly, the accompanying drawings for describing the embodiments are introduced briefly in the following. Apparently, the accompanying drawings in the following description are only some embodiments of the present invention; persons of ordinary skill in the art can obtain other drawings according to the accompanying drawings without creative efforts.

DETAILED DESCRIPTION

The technical solutions in the embodiments of the present invention will be clearly and fully described below with reference to the accompanying drawings in the embodiments of the present invention. It is obvious that the embodiments to be described are only some rather than all of the embodiments of the present invention. All other embodiments derived by persons of ordinary skill in the art based on the embodiments of the present invention without carrying out creative activities should fall within the protection scope of the present invention.

In the embodiments of the present invention, a network data transmission method, device and system are provided; as there are many various specific implementations of the network data transmission method, device and system, detailed description is given below through specific embodiments:

Embodiment 1

Figure 1:
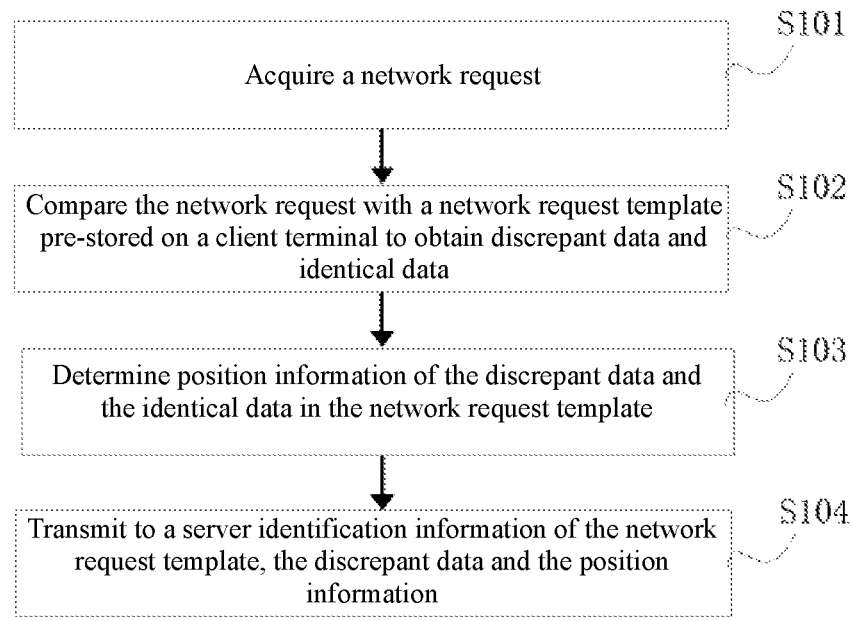
FIG. 1 is a flow chart of a network data transmission method according to an embodiment of the present invention.

Referring to FIG. 1, FIG. 1 illustrates one network data transmission method. The method is applied to a client terminal. The method provided in this embodiment can avoid wasting data traffic of the client terminal and reduce the time to transmit the network request to the server by the client terminal, thus improving the speed at which the client terminal accesses the network. The method includes:

Step S101. A network request is acquired.

The network request refers to a network request between a client terminal and a server, for example, a Hypertext transfer protocol (HTTP) request header. A person having ordinary skill in the art should appreciate that the network request may also be other requests. As each network request contains a great number of repeated data, the client terminal is transmitting to the server a significant amount of repeated data all the time.

An example of a network request is displayed below. In order to save space, only some data of the network request is displayed, for example, a network request transmitted to the server by the client terminal for the first time is as follows:

"Accept: text/html,application/xhtml+xml,application/xml;q=0.9,*/*;q=0.8

Host: baidu.com"

A network request transmitted to the server by the client terminal for the second time is as follows:

"Accept: text/html,application/xhtml+xml,application/xml;q=0.9,*/*;q=0.8

Host: 163.com"

It can be understood through the contents of the two network requests that the contents of the Accept field are the same, while the contents of the Host field are different. In an actual scenario, a great number of repeated fields may exist, and thus a problem to be solved in the present invention is how the meaning of the original network request can be expressed without transmitting the repeated fields, thereby reducing the contents of the network request.

Step S102. The network request is compared with a network request template pre-stored on the client terminal to obtain discrepant data and identical data.

The client terminal may store multiple network requests that have been transmitted before, and take the pre-stored network requests as network request templates. After the client terminal newly generates a network request, the network request is compared with a pre-stored network request template, so as to obtain discrepant data and identical data. The discrepant data refers to a part of the network request which is added relative to the network request template, and the identical data refers to a part of the network request which is identical to the network request template.

Step S103. Position information of the discrepant data and the identical data in the network request template is determined.

After the discrepant data and the identical data are obtained, position information of the discrepant data and the identical data in the network request template is determined. The functions of the position information are as follows: it is possible to find the identical data in the network request template by using the position information. It is also possible to determine by using the position information what position the discrepant data should be placed in the network request template, and thus the network request can be restored by using the position information, the discrepant data and the network request template.

During step S102 and step S103, it is feasible to use one algorithm for implementation. For example, discrepancy operation is performed on the network request and the network request template through a reversible binary diff (command comparison text file) algorithm, and the discrepant data and the position information can be obtained finally through the above algorithm. A person having ordinary skill in the art should appreciate that it is also feasible to use other methods for implementation. For example, an open source xdelta algorithm, a google's vcdecoder algorithm, an open source diffutils algorithm and so on, all of which can achieve discrepancy operation on the network request and the network request template. Finally, the discrepant data and the position information calculated are taken as actually transmitted parts, and as the discrepant data does not have the same part between the network request and the network request template, the size of the discrepant data may be far less than that of the original network request.

Step S104. Identification information of the network request template, the discrepant data and the position information are transmitted to a server, where the identification information will be used to search for, by the server, the network request template pre-stored on the server and corresponding to the identification information, and the network request template, the discrepant data and the position information will be used to restore, by the server, the network request.

The identification information of the network request template, the discrepant data and the position information are transmitted to the server, in order that the server restores the network request by using the network request template, the discrepant data and the position information. The identification information of the network request template refers to a unique identifier of the network request template, which may be represented with several characters. For example, identification information of a certain network request template is specifically BZ1001. A person having ordinary skill in the art should appreciate that there are many coding manners of the identification information of the network request template, which are not repeated herein one by one.

In addition, the identification information may be obtained by using a preset algorithm to calculate data in the network request template. For example, the data in the network request template is calculated by using a Message-Digest Algorithm 5 (MD5) algorithm or a hashkey algorithm, to obtain a unique 8-byte id value, and the id value is used to represent a network request template. In order to authenticate whether the data transmitted to the server by the client terminal is correct or not, it is feasible to calculate the data in the network request by using the MD5 algorithm or the hashkey algorithm to obtain an authentication code and transmit to the server the authentication code; after the server receives the authentication code, the server may calculate data of the restored network request by using the MD5 algorithm or the hashkey algorithm to obtain an information code. Then the server compares whether the authentication code and the information code are the same or not. If they are the same, it indicates that the transmitted data is flawless, and if they are not the same, it indicates that the transmitted data is flawed.

In the embodiment shown in FIG. 1, data transmitted to a server by a client terminal includes identification information of a network request template, discrepant data and position information, and as the data transmitted to the server by the client terminal does not include identical data of a network request and the network request template, a significant amount of repeated contents are reduced, thus reducing transmission of network data; moreover, after receiving the data transmitted by the client terminal, the server can restore the network request by using the network request template, the discrepant data and the position information, thus ensuring correctness of the transmission of network data. Therefore, the solution according to the present invention reduces the time to transmit a network request to the server by the client terminal while ensuring proper transmission of network data, thus improving the speed at which the client terminal accesses the network.

The solution according to the embodiment of the present invention is described below through a specific example:

It is assumed that the network request is as follows:

"Accept:text/html,application/xhtml+xml,application/xml;q=0.9,*/*;q=0.8

Host: baidu.com"

the network request template is as follows:

"Accept:text/html,application/xhtml+xml,application/xml;q=0.9,*/*;q=0.8

Host: 163.com"

In the following, discrepancy operation is performed on the network request and the network request template through a reversible binary diff algorithm. At first, the network request is compared with a pre-stored network request template to obtain discrepant data and identical data, and then position information of the discrepant data and the identical data in the network request template is determined, so as to obtain data as follows:

(0, 70, 0)

(0, 5, b) aidu (8, 4, 0)

Elements in the parentheses refer to position information of the identical data in the network request and the network request template, and contents between the parentheses refer to discrepant data, because positions between the parentheses refer to position information of the discrepant data. The specific meaning of the data in the parentheses is (starting position, read length, end symbol). For example, the first "0" in (0, 70, 0) represents a starting position, that is, start from the first character "A" on the first line of the network request template; "70" in (0, 70, 0) represents a read length, that is, starting from the first character "A" of the network request template, 70 characters are read until the first line of the network request template ends; the second "0" in (0, 70, 0) represents an end symbol, and "0" is used to represent null as the first line has ended.

In (0, 5, b), the first "0" refers to that the starting position of the second line of the network request template is "H". In the process of comparing the network request with the network request template, it is found that 5 successive characters on the second line are the same. They are different from the sixth character, and the sixth character of the network request is "b". Therefore, the first six characters of the network request are represented with (0, 5, b). When the seventh character on the second line of the network request is compared with the seventh character on the second line of the network request template, a difference is found, and the seventh character on the second line of the network request is compared with characters after the seventh character on the second line of the network request template, to determine that there is no data identical therewith, thus defining the seventh character "a" on the second line of the network request as discrepant data. It can be known from the method that the discrepant data further includes "idu". After the discrepant data has been determined, it is found that the eleventh character to the fourteenth character ".com" on the second line of the network request are identical to the ninth character to the twelfth character ".com" on the second line of the network request template, and thus (8, 4, 0) is obtained.

Therefore, it is feasible to perform discrepancy operation on the network request and the network request template through a reversible binary diff algorithm, so as to obtain discrepant data and position information; moreover, the diff algorithm is reversible, network data can also be reversely obtained by using the network request template, the discrepant data and the position information, so as to be suitable for the problem to be solved in the embodiment of the present invention, that is, the same part in the network request and the network request template is deleted, and only the identification information of the network request template, the discrepant data and the position information are transmitted, to reduce the transmission amount of the data of the transmitted network request.

Embodiment 2

Figure 2:
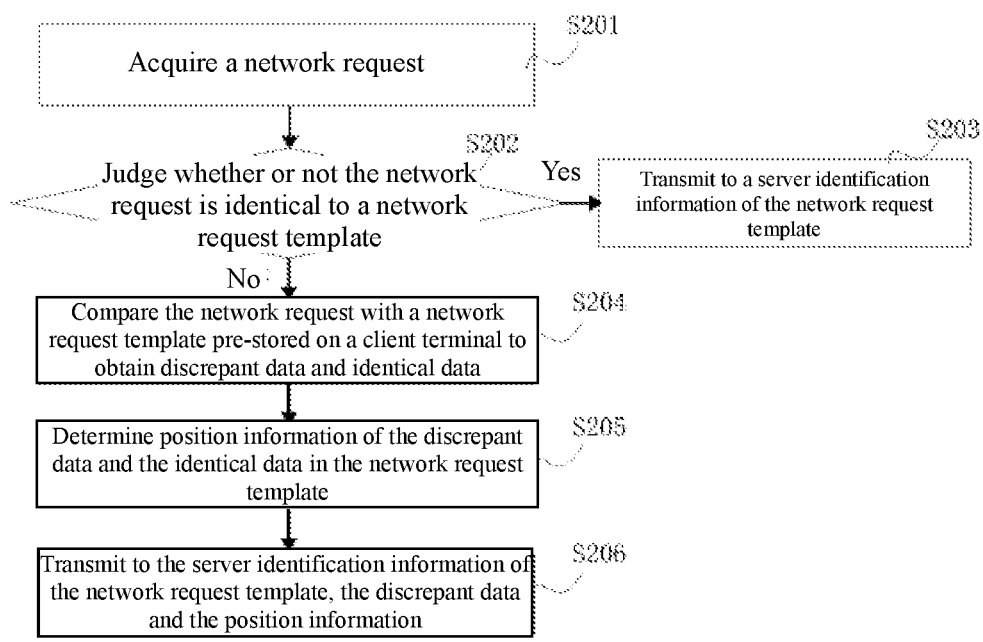
FIG. 2 is a flow chart of another network data transmission method according to an embodiment of the present invention.

Referring to FIG. 2, FIG. 2 illustrates another network data transmission method. The method is applied to a client terminal. The method provided in this embodiment can avoid wasting the data traffic of the client terminal and reduce the time to transmit the network request to the server by the client terminal, thus improving the speed at which the client terminal accesses the network. The method includes:

Step S201. A network request is acquired.

The network request refers to a network request between a client terminal and a server, for example, an HTTP request header. A person having ordinary skill in the art should appreciate that the network request may also be other requests. As each network request contains a great number of repeated data, the client terminal is transmitting to the server a significant amount of repeated data all the time.

Step S202. Whether or not the network request is identical to the network request template is judged, if yes, step S203 is performed, and otherwise, step S204 is performed.

It is likely that a network request newly generated by the client terminal is identical to a pre-stored network request template. if they are identical, the client terminal only needs to transmit to the server identification information of the network request template, thus reducing the data amount transmitted to the server by the client terminal and reducing the time for transmitting the network request to the server by the client terminal.

Step S203. Identification information of the network request template is transmitted to the server.

Step S204. The network request is compared with a network request template pre-stored on a client terminal to obtain discrepant data and identical data.

The client terminal may store multiple network requests that have been transmitted before, and take the pre-stored network requests as a network request template. After the client terminal newly generates a network request, the network request is compared with a pre-stored network request template, so as to obtain discrepant data and identical data. The discrepant data refers to a part of the network request which is added relative to the network request template, and the identical data refers to a part of the network request which is identical to the network request template.

Step S205. Position information of the discrepant data and the identical data in the network request template is determined.

After the discrepant data and the identical data are obtained, position information of the discrepant data and the identical data in the network request template is determined. The functions of the position information are as follows: it is possible to find the identical data in the network request template by using the position information, it is also possible to determine by using the position information what position the discrepant data should be placed in the network request template, and thus the network request can be restored by using the position information, the discrepant data and the network request template.

During step S204 and step S205, it is feasible to use one algorithm for implementation. For example, discrepancy operation is performed on the network request and the network request template through a reversible binary diff algorithm, and the discrepant data and the position information can be obtained finally through the algorithm. A person having ordinary skill in the art should appreciate that it is also feasible to use other methods for implementation. For example, an open source xdelta algorithm, a google's vcdecoder algorithm, an open source diffutils algorithm and so on, all of which can achieve discrepancy operation on the network request and the network request template. Finally, the calculated discrepant data and the position information are taken as actually transmitted parts. Because the discrepant data does not have the identical part between the network request and the network request template, the size of the discrepant data may be far less than that of the original network request.

Step S206. The identification information of the network request template, the discrepant data and the position information are transmitted to a server, where the identification information will be used to search for, by the server, the network request template pre-stored on the server and corresponding to the identification information, and the network request template, the discrepant data and the position information will be used to restore, by the server, the network request.

The identification information of the network request template, the discrepant data and the position information are transmitted to the server, in order that the server restores the network request by using the network request template, the discrepant data and the position information. The identification information of the network request template refers to a unique identifier of the network request template, which may be represented with several characters. For example, identification information of a certain network request template is specifically BZ1001. A person having ordinary skill in the art should appreciate that there are many coding manners of the identification information of the network request template, which are not repeated herein one by one.

In the embodiment shown in FIG. 2, the solution of the present invention not only can reduce the time to transmit the network request to the server by the client terminal while ensuring proper transmission of network data, and improve the speed at which the client terminal accesses the network; but also can judge that a network request newly generated by the client terminal may be identical to the pre-stored network request template. If they are identical, the client terminal only needs to transmit to the server the identification information of the network request template, thus reducing the data amount transmitted to the server by the client terminal to a greater extent and reducing the time to transmit the network request to the server by the client terminal; in addition, the server does not need to make any calculation and restoration operations.

Embodiment 3

Figure 3:
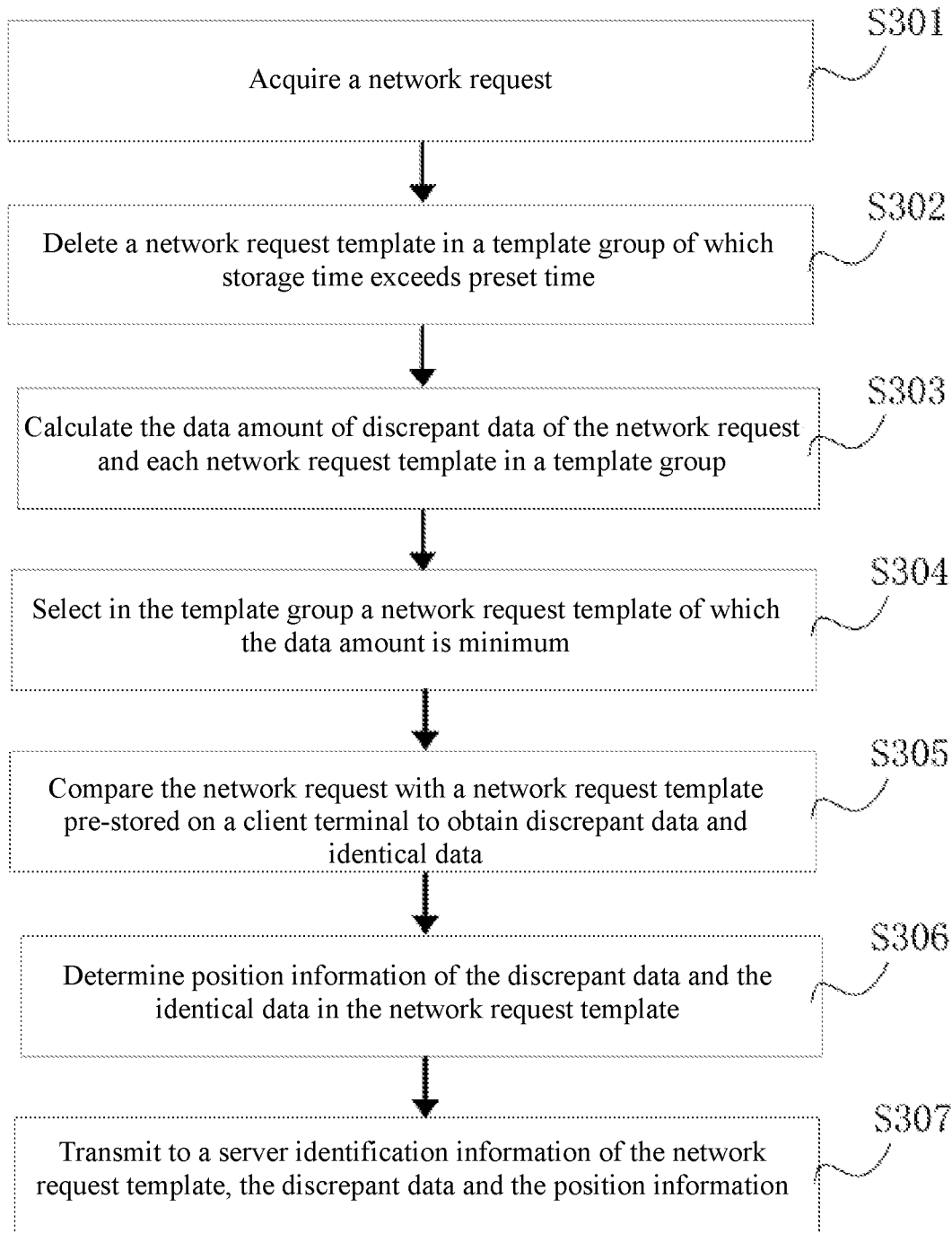
FIG. 3 is a flow chart of a further network data transmission method according to an embodiment of the present invention.

Referring to FIG. 3, FIG. 3 illustrates a further network data transmission method; the method is applied to a client terminal. The method provided in this embodiment can reduce the transmission amount of data transmitted to the server by the client terminal. The method includes:

Step S301. A network request is acquired.

The network request refers to a network request between a client terminal and a server, for example, an HTTP request header. A person having ordinary skill in the art should appreciate that may also be other requests. As each network request contains a great number of repeated data, the client terminal is transmitting to the server a significant amount of repeated data all the time.

Step S302. A network request template in a template group of which storage time exceeds preset time is deleted.

The template group includes multiple network request templates; as resources of the client terminal and the server are limited and data cannot be buffered without limit, a certain number of network request templates in the template group may be periodically deleted. The preset time is a time period that a user can set on his/her own.

Step S303. The data amount of discrepant data of the network request and each network request template in the template group is calculated.

The discrepant data is data that the client terminal has to transmit to the server; therefore, the less the discrepant data is, the less the data amount that the client terminal needs to transmit to the server is; accordingly, the data amount of discrepant data of the network request and each network request template in a template group is calculated, and a network request template of which the data amount is minimum is selected, so that the transmission amount of data transmitted to the server by the client terminal can be reduced.

Step S304. A network request template of which the data amount is minimum is selected in the template group.

Step S305. The network request is compared with a network request template pre-stored on a client terminal to obtain discrepant data and identical data.

The client terminal may store multiple network requests that have been transmitted before, and take the pre-stored network requests as a network request template. After the client terminal newly generates a network request, the network request is compared with a pre-stored network request template, so as to obtain discrepant data and identical data. The discrepant data refers to a part of the network request which is added relative to the network request template, and the identical data refers to a part of the network request which is identical to the network request template.

Step S306. Position information of the discrepant data and the identical data in the network request template is determined.

After the discrepant data and the identical data are obtained, position information of the discrepant data and the identical data in the network request template is determined. The functions of the position information are as follows: it is possible to find the identical data in the network request template by using the position information, it is also possible to determine by using the position information what position the discrepant data should be placed in the network request template, and thus the network request can be restored by using the position information, the discrepant data and the network request template.

During step S305 and step S306, it is feasible to use one algorithm for implementation. For example, discrepancy operation is performed on the network request and the network request template through a reversible binary diff algorithm, and the discrepant data and the position information can be obtained finally through the algorithm. A person having ordinary skill in the art should appreciate that it is also feasible to use other methods for implementation, for example, an open source xdelta algorithm, a google's vcdecoder algorithm, an open source diffutils algorithm and so on, all of which can achieve discrepancy operation on the network request and the network request template. Finally, the discrepant data and the position information calculated are taken as actually transmitted parts. Because the discrepant data does not have the same part between the network request and the network request template, the size of the discrepant data may be far less than that of the original network request.

Step S307. Identification information of the network request template, the discrepant data and the position information are transmitted to a server, where the identification information will be used to search for, by the server, the network request template pre-stored on the server and corresponding to the identification information, and the network request template, the discrepant data and the position information will be used to restore, by the server, the network request.

The identification information of the network request template, the discrepant data and the position information are transmitted to the server, in order that the server restores the network request by using the network request template, the discrepant data and the position information. The identification information of the network request template refers to a unique identifier of the network request template, which may be represented with several characters. For example, identification information of a certain network request template is specifically BZ1001. A person having ordinary skill in the art should appreciate that there are many coding manners of the identification information of the network request template, which are not repeated herein one by one.

In the embodiment shown in FIG. 3, the solution of the present invention not only can reduce the time to transmit the network request to the server by the client terminal while ensuring proper transmission of network data, and improve the speed at which the client terminal accesses the network; but also can reduce the transmission amount of data transmitted to the server by the client terminal.

Embodiment 4

Figure 4:
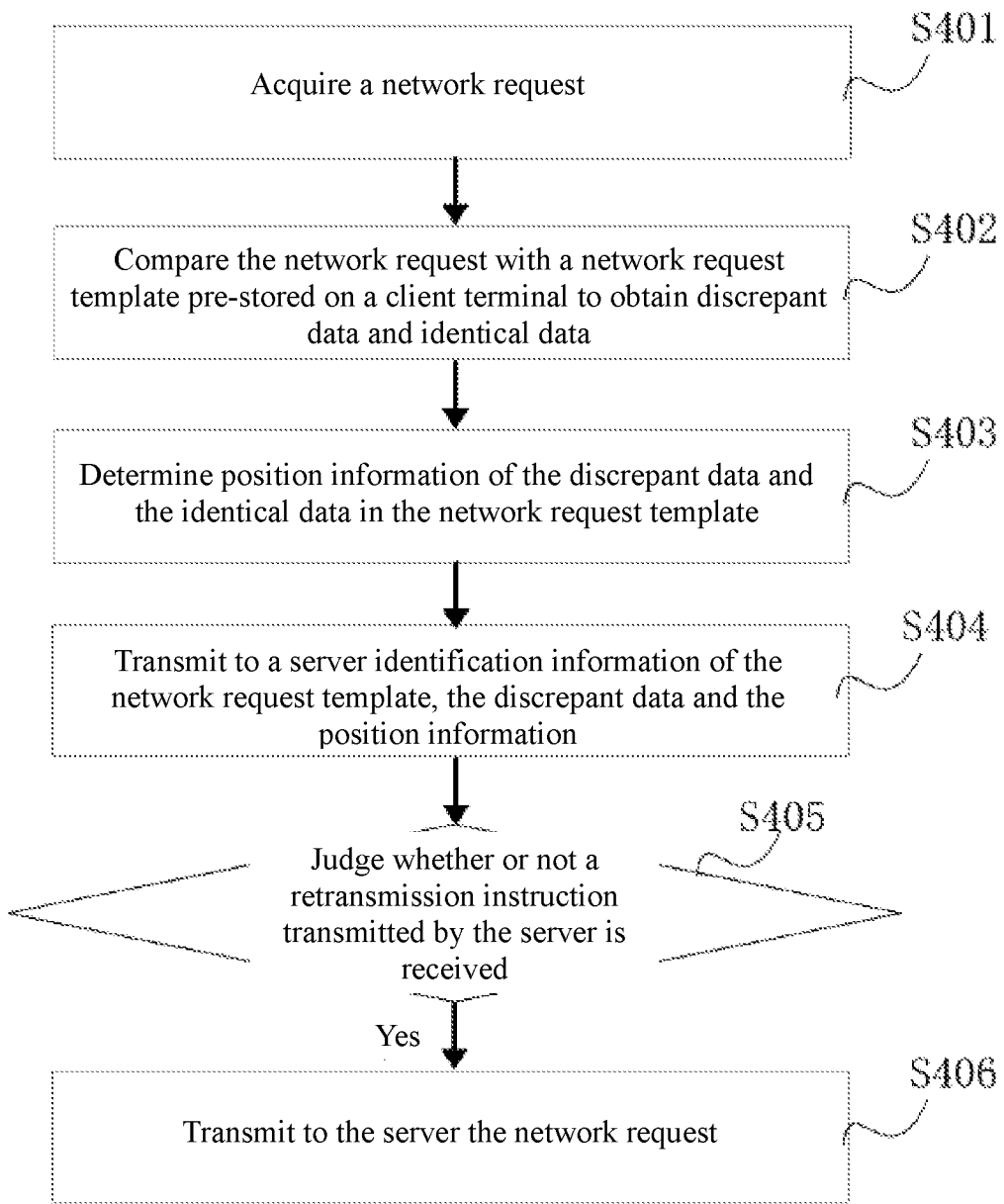
FIG. 4 is a flow chart of a further network data transmission method according to an embodiment of the present invention.

Referring to FIG. 4, FIG. 4 illustrates a further network data transmission method. The method is applied to a client terminal. The method provided in this embodiment can retransmit a complete network request in the case that the transmitted data is lost, garbled and so on. The method includes:

Step S401. A network request is acquired.

The network request refers to a network request between a client terminal and a server, for example, an HTTP request header. A person having ordinary skill in the art should appreciate that the network request may also be other requests. As each network request contains a great number of repeated data, the client terminal is transmitting to the server a significant amount of repeated data all the time.

Step S402. The network request is compared with a network request template pre-stored on a client terminal to obtain discrepant data and identical data.

The client terminal may store multiple network requests that have been transmitted before, and take the pre-stored network requests as network request templates. After the client terminal newly generates a network request, the network request is compared with a pre-stored network request template, so as to obtain discrepant data and identical data. The discrepant data refers to a part of the network request which is added relative to the network request template, and the identical data refers to a part of the network request which is identical to the network request template.

Step S403. Position information of the discrepant data and the identical data in the network request template is determined.

After the discrepant data and the identical data are obtained, position information of the discrepant data and the identical data in the network request template is determined. The functions of the position information are as follows: it is possible to find the identical data in the network request template by using the position information, it is also possible to determine by using the position information what position the discrepant data should be placed in the network request template, and thus the network request can be restored by using the position information, the discrepant data and the network request template.

During step S402 and step S403, it is feasible to use one algorithm for implementation For example, discrepancy operation is performed on the network request and the network request template through a reversible binary diff algorithm, and the discrepant data and the position information can be obtained finally through the algorithm. A person having ordinary skill in the art should appreciate that it is also feasible to use other implementation methods, for example, an open source xdelta algorithm, a google's vcde-coder algorithm, an open source diffutils algorithm and so on, all of which can achieve discrepancy operation on the network request and the network request template. Finally, the discrepant data and the position information calculated are taken as actually transmitted parts. Because the discrepant data does not have the same part between the network request and the network request template, the size of the discrepant data may be far less than that of the original network request.

Step S404. Identification information of the network request template, the discrepant data and the position information are transmitted to a server, where the identification information will be used to search for, by the server, the network request template pre-stored on the server and corresponding to the identification information, and the network request template, the discrepant data and the position information will be used to restore, by the server, the network request.

The identification information of the network request template, the discrepant data and the position information are transmitted to the server, in order that the server restores the network request by using the network request template, the discrepant data and the position information. The identification information of the network request template refers to a unique identifier of the network request template, which may be represented with several characters, for example, identification information of a certain network request template is specifically BZ1001. A person having ordinary skill in the art should appreciate that there are many coding manners of the identification information of the network request template, which are not repeated herein one by one.

Step S405. Whether a retransmission instruction transmitted by the server is received is judged, and if yes, step S406 is performed.

In the process of transmitting data to the server by the client terminal, various possibilities may result in that the data transmitted to the server by the client terminal is lost, garbled and so on; therefore, in this case, the server may usually transmit to the client terminal a retransmission instruction, and once receiving the retransmission instruction transmitted by the server, the client terminal will transmit to the server a complete network request generated by the client terminal.

Step S406. The network request is transmitted to the server.

In the embodiment shown in FIG. 4, the solution of the present invention not only can reduce the time to transmit the network request to the server by the client terminal while ensuring proper transmission of network data, and improve the speed at which the client terminal accesses the network; but also can retransmit a complete network request in the case that the transmitted data is lost, garbled and so on.

Embodiment 5

Figure 5:
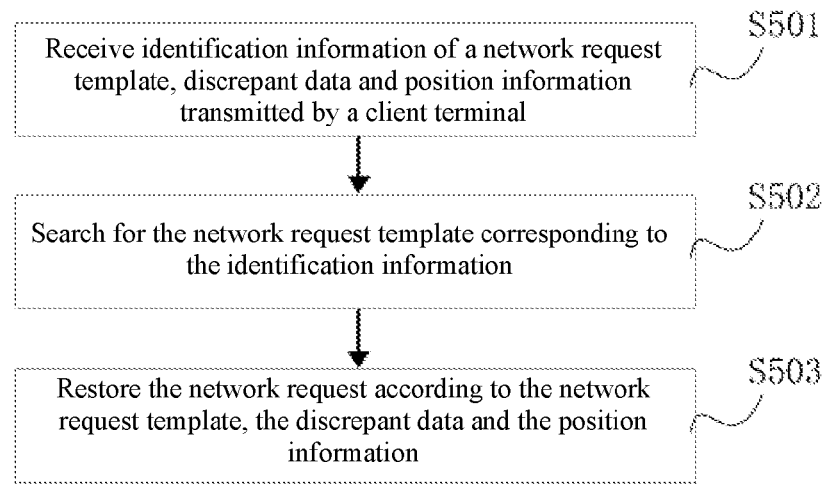
FIG. 5 is a flow chart of a further network data transmission method according to an embodiment of the present invention.

Referring to FIG. 5, FIG. 5 illustrates a further network data transmission method. The method is applied to a server. The method provided in this embodiment can avoid wasting the data traffic of the client terminal and reduce the time to transmit the network request to the server by the client terminal, thus improving the speed at which the client terminal accesses the network, and the method includes:

Step S501. Identification information of a network request template, discrepant data and position information transmitted by a client terminal are received.

The discrepant data and identical data are obtained by the client terminal after comparing an acquired network request with the network request template stored therein, and the position information is determined by the client terminal according to positions of the discrepant data and the identical data in the network request template.

Step S502. The network request template corresponding to the identification information is searched.

The server may store multiple network requests that have been received before, and take the pre-stored network requests as a network request template. The server end pre-stores a corresponding relationship between network request templates and identification information, and each piece of identification information corresponds to a unique network request template; therefore, after the identification information is acquired, the corresponding network request template can be found with the identification information.

Step S503. The network request is restored according to the network request template, the discrepant data and the position information.

The network request is restored according to the network request template, the discrepant data and the position information through a reversible binary diff algorithm. A person having ordinary skill in the art should appreciate that the network request may also be restored with other methods, for example, an open source xdelta algorithm, a google's vcdecoder algorithm, an open source diffutils algorithm and so on. However, the algorithm used by the server has to be consistent with that used by the client terminal, so as to ensure that the server can perform reverse operation.

In the embodiment shown in FIG. 5, data transmitted to a server by a client terminal includes identification information of a network request template, discrepant data and position information. Because the data transmitted to the server by the client terminal does not include identical data of a network request and the network request template, a significant amount of repeated contents are reduced, thus reducing transmission of network data. Moreover, after receiving the data transmitted by the client terminal, the server can restore the network request by using the network request template, the discrepant data and the position information, thus ensuring correctness of the transmission of network data. Therefore, the solution according to the present invention reduces the time to transmit a network request to the server by the client terminal while ensuring proper transmission of network data, thus improving the speed at which the client terminal accesses the network.

Embodiment 6

Figure 6:
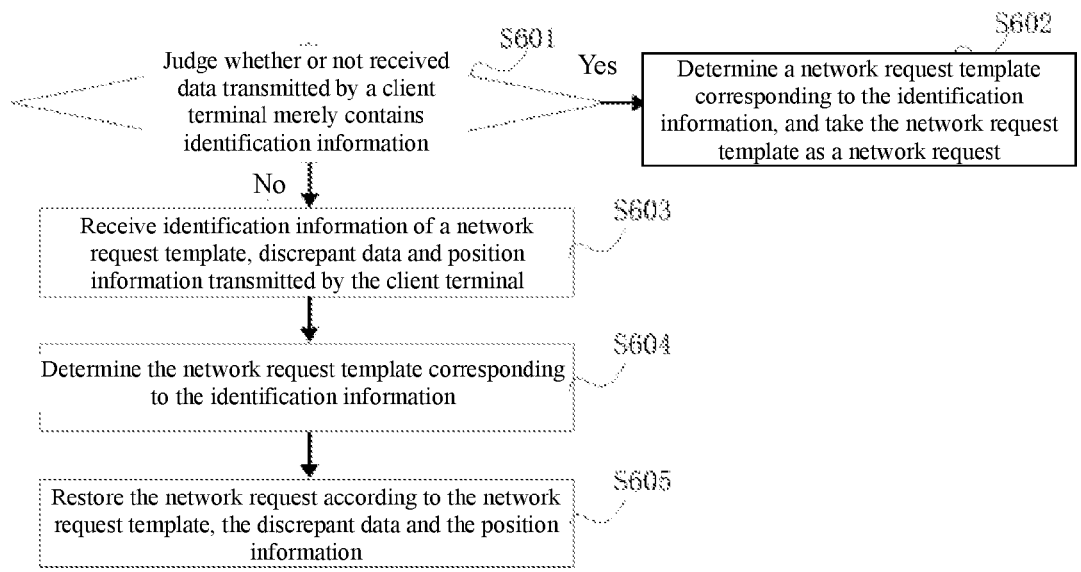
FIG. 6 is a flow chart of a further network data transmission method according to an embodiment of the present invention.

Referring to FIG. 6, FIG. 6 illustrates a further network data transmission method. The method is applied to a server, according to the method provided in this embodiment, in the case that identification information merely containing a network request template is received, it is only needed to find a network request template corresponding to the identification information and take the network request template as a network request, thus greatly shortening the time to receive data transmitted by the client terminal to the server, and the method includes:

Step S601. Whether received data transmitted by a client terminal merely contains identification information of a network request template is judged, if yes, step S602 is performed, and otherwise, step S603 is performed.

If the received data transmitted by the client terminal merely contains the identification information of the network request template, it indicates that the client terminal has found a network request template identical to the network request, and thus the client terminal will only transmit the identification information of the network request template, and the server only needs to find a network request template corresponding to the identification information and take the network request template as a network request, thus greatly shortening the time to receive data transmitted by the client terminal to the server.

Step S602. A network request template corresponding to the identification information is determined, and the network request template is taken as a network request.

Step S603. Identification information of the network request template, discrepant data and position information transmitted by the client terminal are received.

The identification information of the network request template, the discrepant data and the position information are transmitted from the client terminal. The position information is determined by the client terminal according to position information of the discrepant data and identical data in the network request template, the discrepant data and the identical data are obtained by the client terminal by comparing the network request with the network request template, and the network request is generated by the client terminal.

Step S604. The network request template corresponding to the identification information is determined.

The server may store multiple network requests that have been received before, and take the pre-stored network requests as a network request template. The server end pre-stores a corresponding relationship between network request templates and identification information, and each piece of identification information corresponds to a unique network request template. Therefore, after the identification information is acquired, the corresponding network request template can be found through the identification information.

Step S605. The network request is restored according to the network request template, the discrepant data and the position information.

The network request is restored according to the network request template, the discrepant data and the position information through a reversible binary diff algorithm. A person having ordinary skill in the art should appreciate that the network request may also be restored with other methods, for example, an open source xdelta algorithm, a google's vcdecoder algorithm, an open source diffutils algorithm and so on. However, the algorithm used by the server has to be consistent with that used by the client terminal, so as to ensure that the server can perform reverse operation.

In the embodiment shown in FIG. 6, the solution provided in the present invention can reduce the time to transmit the network request to the server by the client terminal while ensuring proper transmission of network data, and improve the speed at which the client terminal accesses the network. Moreover, in the case that identification information only containing a network request template is received, it is only needed to find a network request template corresponding to the identification information and take the network request template as a network request, thus greatly shortening the time to receive data transmitted by the client terminal to the server. In addition, the server does not need to make any calculation and restoration operations.

Embodiment 7

Figure 7:
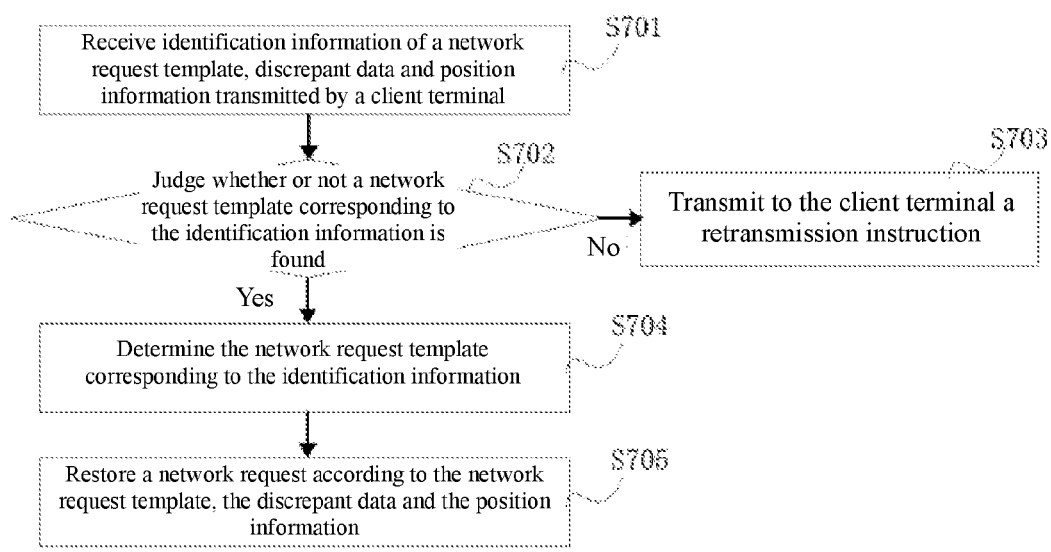
FIG. 7 is a flow chart of a further network data transmission method according to an embodiment of the present invention.

Referring to FIG. 7, FIG. 7 illustrates a further network data transmission method. The method is applied to a server. According to the method provided in this embodiment, in the case that the server has not found a network request template corresponding to identification information, a client terminal is required to retransmit complete network data, to avoid that an error occurs again in a transmission process. The method includes:

Step S701. Identification information of a network request template, discrepant data and position information transmitted by a client terminal are received.

The discrepant data and the identical data are obtained by the client terminal by comparing an acquired network request with the network request template stored therein, and the position information is determined by the client terminal according to positions of the discrepant data and the identical data in the network request template.

Step S702. Whether a network request template corresponding to the identification information is found is judged, if yes, step S704 is performed, and otherwise, step S703 is performed.

There are several situations where the server does not find the network request template corresponding to the identification information, the first one is that the server has not yet stored the identification information and the network request template; the second one is that the identification information loses some data in the process of transmitting the identification information to the server by the client terminal, and so on. In some embodiments, no matter which situation it belongs to, a retransmission instruction may be transmitted to the client terminal.

Step S703. A retransmission instruction is transmitted to the client terminal.

The retransmission instruction refers to a generated complete network request that the client terminal is required to transmit, to avoid that an error occurs again in the transmission process.

Step S704. A network request template corresponding to the identification information is determined.

The server may store multiple network requests that have been received before, and take the pre-stored network requests as a network request template. The server end pre-stores a corresponding relationship between network request templates and identification information, and each piece of identification information corresponds to a unique network request template. Therefore, after the identification information is acquired, the corresponding network request template can be found through the identification information.

Step S705. A network request is restored according to the network request template, the discrepant data and the position information.

The network request is restored according to the network request template, the discrepant data and the position information through a reversible binary diff algorithm. A person having ordinary skill in the art should appreciate that the network request may also be restored with other methods, for example, an open source xdelta algorithm, a google's vcdecoder algorithm, an open source diffutils algorithm and so on. However, the algorithm used by the server has to be consistent with that used by the client terminal, so as to ensure that the server can perform reverse operation.

In the embodiment shown in FIG. 7, the solution provided in the present invention can reduce the time to transmit the network request to the server by the client terminal while ensuring proper transmission of network data, and improve the speed at which the client terminal accesses the network; moreover, in the case that the server has not found a network request template corresponding to the identification information, the client terminal is required to retransmit complete network data, to avoid that an error occurs again in the transmission process.

Embodiment 8

Figure 8:
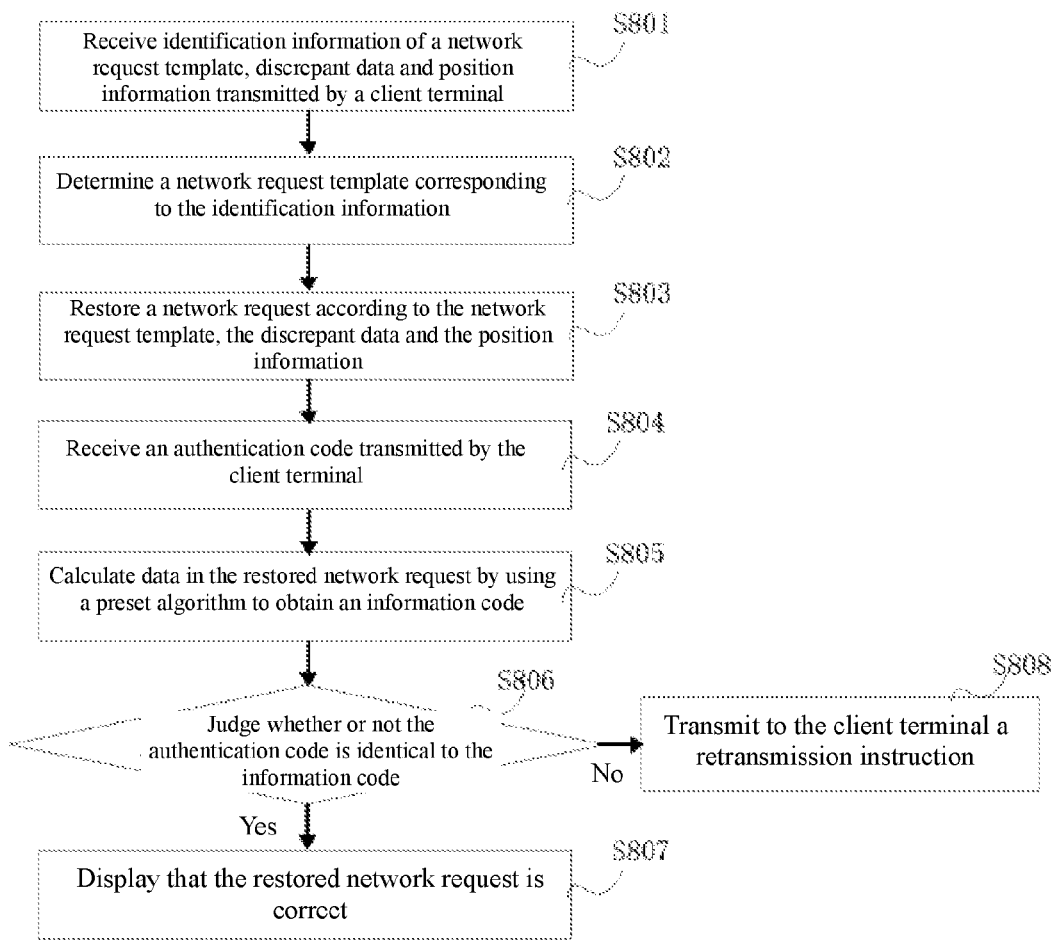
FIG. 8 is a flow chart of a further network data transmission method according to an embodiment of the present invention.

Referring to FIG. 8, FIG. 8 illustrates a further network data transmission method; the method is applied to a server, according to the method in this embodiment, it is feasible to authenticate whether data transmitted to the server by a client terminal is correct or not, if no, it indicates that the transmitted data is flawed, the client terminal is required to retransmit complete network data, and the method includes:

Step S801. Identification information of a network request template, discrepant data and position information transmitted by a client terminal are received.

The identification information of the network request template, the discrepant data and the position information are transmitted from the client terminal. The position information is determined by the client terminal according to position information of the discrepant data and identical data in the network request template, the discrepant data and the identical data are obtained by the client terminal by comparing the network request with the network request template, and the network request is generated by the client terminal.

Step S802. A network request template corresponding to the identification information is determined.

The server may store multiple network requests that have been received before, and take the pre-stored network requests as a network request template. The server end pre-stores a corresponding relationship between network request templates and identification information, and each piece of identification information corresponds to a unique network request template; therefore, after the identification information is acquired, the corresponding network request template can be found through the identification information.

Step S803. A network request is restored according to the network request template, the discrepant data and the position information.

The network request is restored according to the network request template, the discrepant data and the position information through a reversible binary diff algorithm. A person having ordinary skill in the art should appreciate that the network request may also be restored with other methods, for example, an open source xdelta algorithm, a google's vcdecoder algorithm, an open source diffutils algorithm and so on. However, the algorithm used by the server has to be consistent with that used by the client terminal, so as to ensure that the server can perform reverse operation.

Step S804. An authentication code transmitted by the client terminal is received, and the authentication code is obtained by the client terminal by using a preset algorithm to calculate data in the network request.

In order to authenticate whether data transmitted to the server by the client terminal is correct or not, the server may receive an authentication code obtained by the client terminal by using an MD5 algorithm or a hashkey algorithm to calculate data in the network request; after the server receives the authentication code, the server may calculate data of the restored network request by using the MD5 algorithm or the hashkey algorithm to obtain an information code, then the server compares whether the authentication code and the information code are the same or not, if they are the same, it indicates that the transmitted data is flawless, and if they are not the same, it indicates that the transmitted data is flawed and the client terminal is required to retransmit a complete network request.

Step S805. Data in the restored network request is calculated by using the preset algorithm to obtain an information code.

Step S806. Whether the authentication code is identical to the information code is judged, if yes, step S807 is performed, and otherwise, step S808 is performed.

Step S807. It is displayed that the restored network request is correct.

Step S808. A retransmission instruction is transmitted to the client terminal.

In the embodiment shown in FIG. 8, the solution provided in the present invention can reduce the time to transmit the network request to the server by the client terminal while ensuring proper transmission of network data, and improve the speed at which the client terminal accesses the network; moreover, it is feasible to authenticate whether data transmitted to the server by the client terminal is correct or not, and if no, it indicates that the transmitted data is flawed and the client terminal is required to retransmit a complete network request.

Embodiment 9

Figure 9:
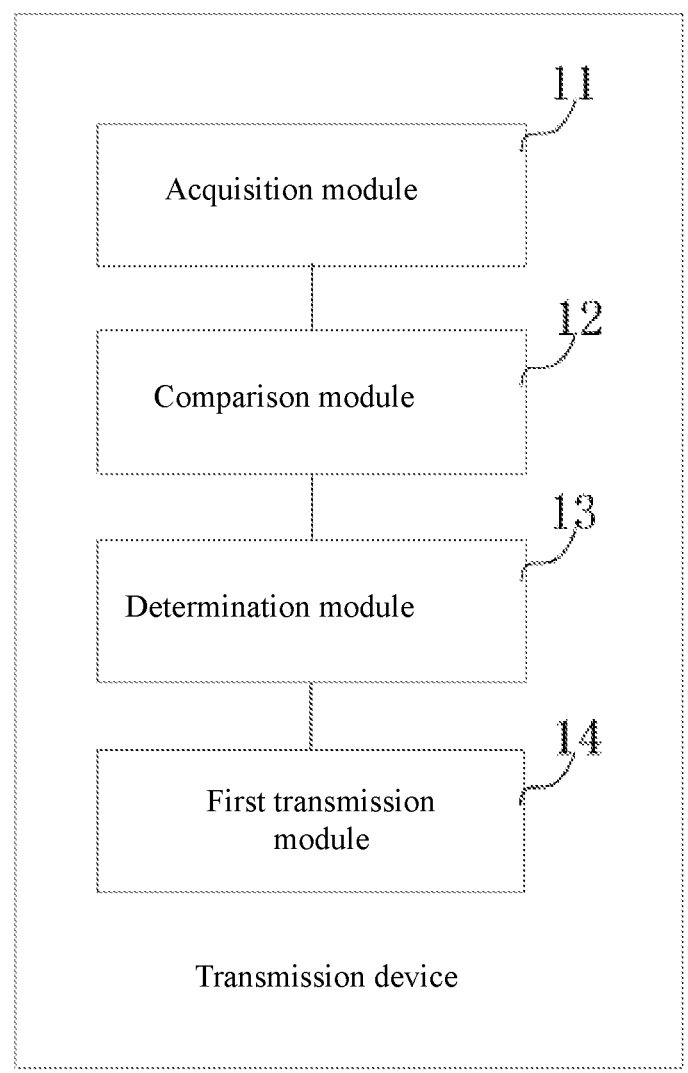
FIG. 9 is a schematic module diagram of a network data transmission device according to an embodiment of the present invention.

Referring to FIG. 9, FIG. 9 illustrates one network data transmission device; the device provided in this embodiment can avoid wasting the data traffic of a client terminal and reduce the time to transmit a network request to a server by the client terminal, thus improving the speed at which the client terminal accesses the network, and the device includes:

an acquisition module 11, configured to acquire a network request;

a comparison module 12 configured to compare the network request with a network request template pre-stored on a client terminal to obtain discrepant data and identical data;

a determination module 13 configured to determine position information of the discrepant data and the identical data in the network request template; and a first transmission module 14 configured to transmit to a server identification information of the network request template, the discrepant data and the position information, where the identification information will be used to search for, by the server, the network request template pre-stored on the server and corresponding to the identification information, and the network request template, the discrepant data and the position information will be used to restore, by the server, the network request.

In the embodiment shown in FIG. 9, the functions of the transmission device provided in this embodiment correspond to those implemented in Embodiment 1, and thus reference can be made to the contents in Embodiment 1 for the functions of respective modules in this embodiment, which are not repeated herein one by one.

Embodiment 10

Figure 10:
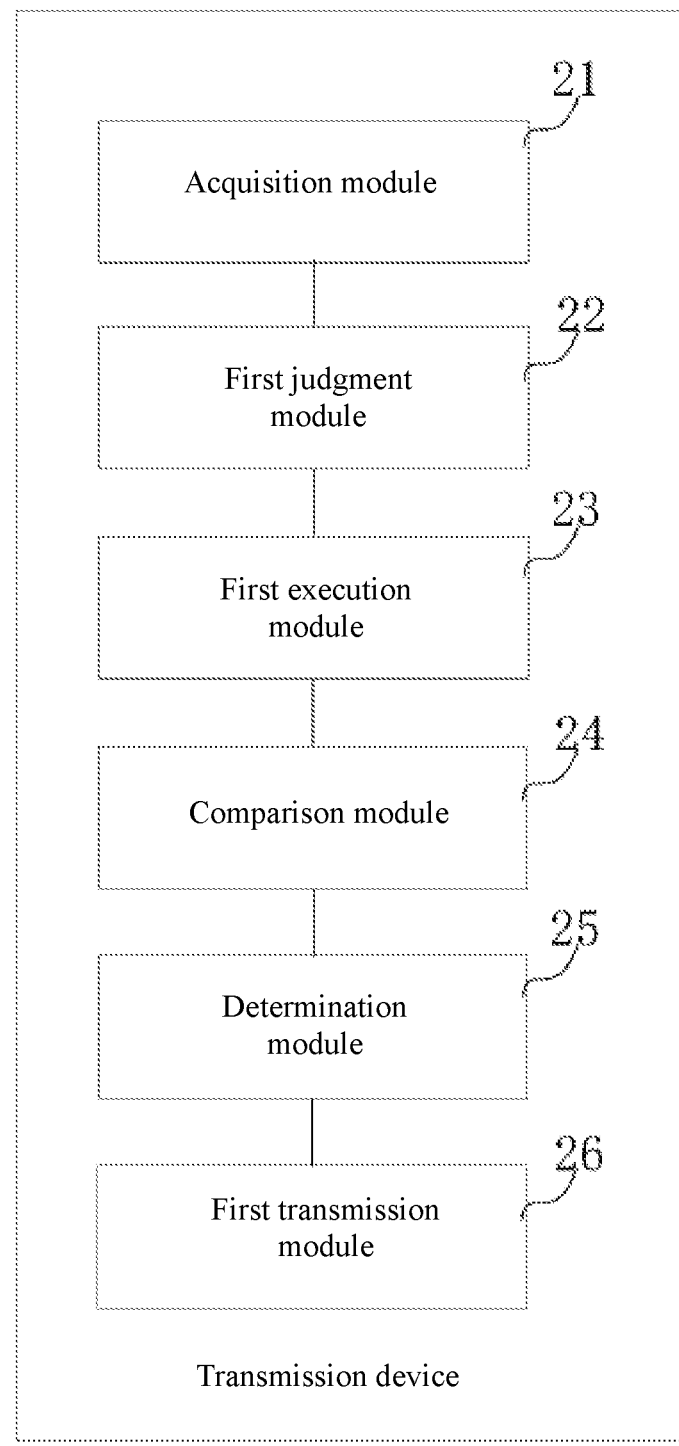
FIG. 10 is a schematic module diagram of another network data transmission device according to an embodiment of the present invention.

Referring to FIG. 10, FIG. 10 illustrates another network data transmission device; the device provided in this embodiment can avoid wasting the data traffic of a client terminal and reduce the time to transmit a network request to a server by the client terminal, thus improving the speed at which the client terminal accesses the network, and the device includes:

an acquisition module 21 configured to acquire a network request;

a first judgment module 22 configured to judge whether or not the network request is identical to a network request template;

a first execution module 23 configured to, when the network request is identical to the network request template, transmit to a server identification information of the network request template; and when the network request is not identical to the network request template, execute a comparison module 24;

the comparison module 24 configured to compare the network request with a network request template pre-stored on a client terminal to obtain discrepant data and identical data;

a determination module 25 configured to determine position information of the discrepant data and the identical data in the network request template; and a first transmission module 26 configured to transmit to the server the identification information of the network request template, the discrepant data and the position information, where the identification information will be used to search for, by the server, the network request template pre-stored on the server and corresponding to the identification information, and the network request template, the discrepant data and the position information will be used to restore, by the server, the network request.

In the embodiment shown in FIG. 10, the functions of the transmission device provided in this embodiment correspond to those implemented in Embodiment 2, and thus reference can be made to the contents in Embodiment 2 for the functions of respective modules in this embodiment, which are not repeated herein one by one.

Embodiment 11

Figure 11:
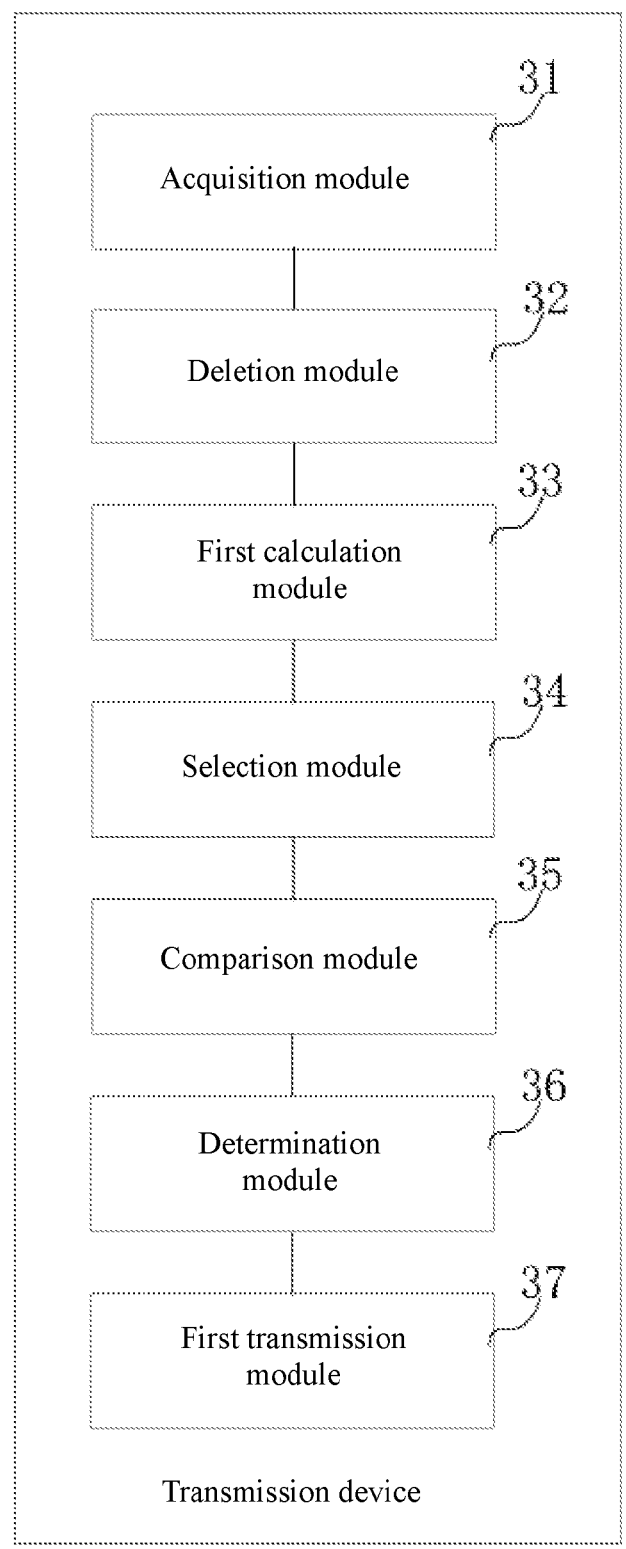
FIG. 11 is a schematic module diagram of a further network data transmission device according to an embodiment of the present invention.

Referring to FIG. 11, FIG. 11 illustrates a further network data transmission device. The device provided in this embodiment can reduce the transmission amount of data transmitted to the server by the client terminal. The device includes:

an acquisition module 31 configured to acquire a network request;

a deletion module 32 configured to delete a network request template in a template group of which storage time exceeds preset time;

a first calculation module 33 configured to calculate the data amount of discrepant data of the network request and each network request template in the template group;

a selection module 34 configured to select in the template group a network request template of which the data amount is minimum;

a comparison module 35 configured to compare the network request with a network request template pre-stored on a client terminal to obtain discrepant data and identical data;

a determination module 36 configured to determine position information of the discrepant data and the identical data in the network request template; and a first transmission module 37 configured to transmit to a server identification information of the network request template, the discrepant data and the position information, where the identification information will be used to search for, by the server, the network request template pre-stored on the server and corresponding to the identification information, and the network request template, the discrepant data and the position information will be used to restore, by the server, the network request.

In the embodiment shown in FIG. 11, the functions of the transmission device provided in this embodiment correspond to those implemented in Embodiment 3, and thus reference can be made to the contents in Embodiment 3 for the functions of respective modules in this embodiment, which are not repeated herein one by one.

Embodiment 12

Figure 12:
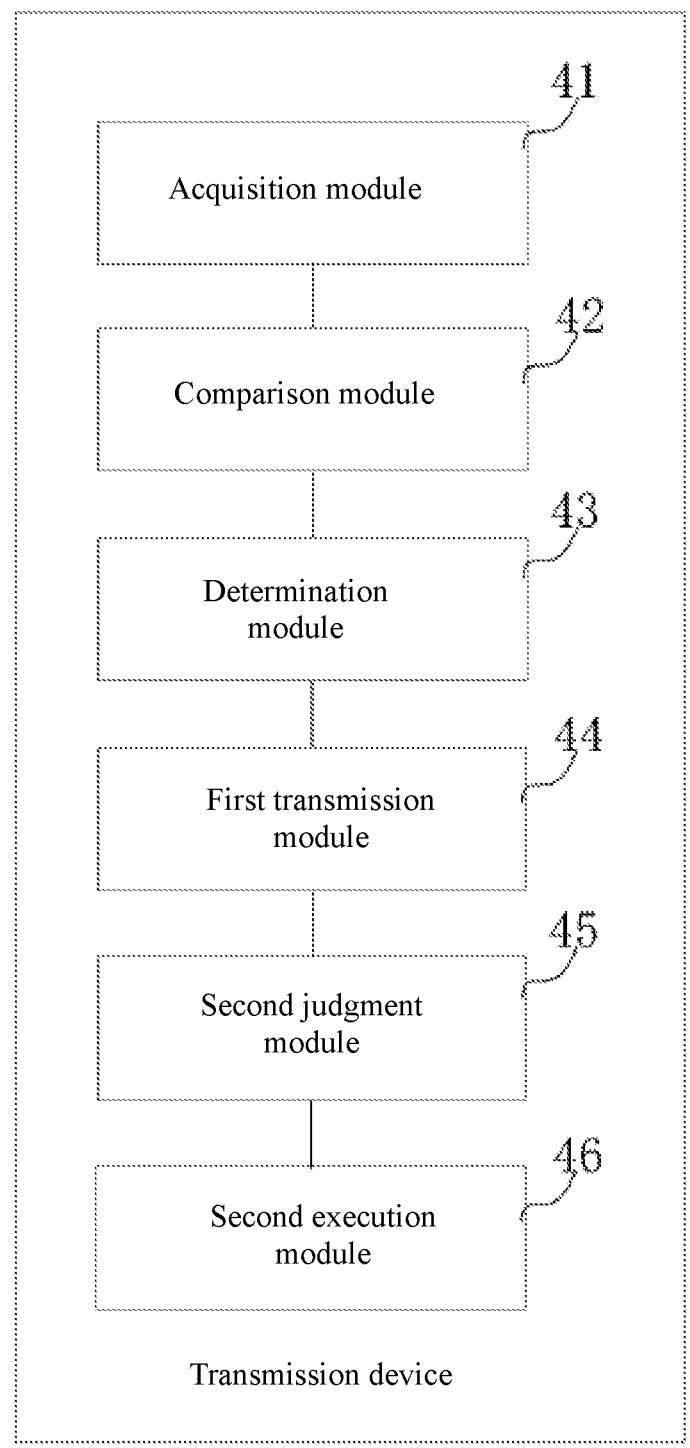
FIG. 12 is a schematic module diagram of a further network data transmission device according to an embodiment of the present invention.

Referring to FIG. 12, FIG. 12 illustrates a further network data transmission device. The device provided in this embodiment can retransmit a complete network request in the case that the transmitted data is lost, garbled and so on. The device includes:

an acquisition module 41 configured to acquire a network request;

a comparison module 42 configured to compare the network request with a network request template pre-stored on a client terminal to obtain discrepant data and identical data;

a determination module 43 configured to determine position information of the discrepant data and the identical data in the network request template;

a first transmission module 44 configured to transmit to a server identification information of the network request template, the discrepant data and the position information, where the identification information will be used to search for, by the server, the network request template pre-stored on the server and corresponding to the identification information, and the network request template, the discrepant data and the position information will be used to restore, by the server, the network request;

a second judgment module 45 configured to judge whether or not a retransmission instruction transmitted by the server is received; and a second execution module 46 configured to, when the retransmission instruction transmitted by the server is received, transmit to the server the network request.

In the embodiment shown in FIG. 12, the functions of the transmission device provided in this embodiment correspond to those implemented in Embodiment 4, and thus reference can be made to the contents in Embodiment 4 for the functions of respective modules in this embodiment, which are not repeated herein one by one.

Embodiment 13

Figure 13:
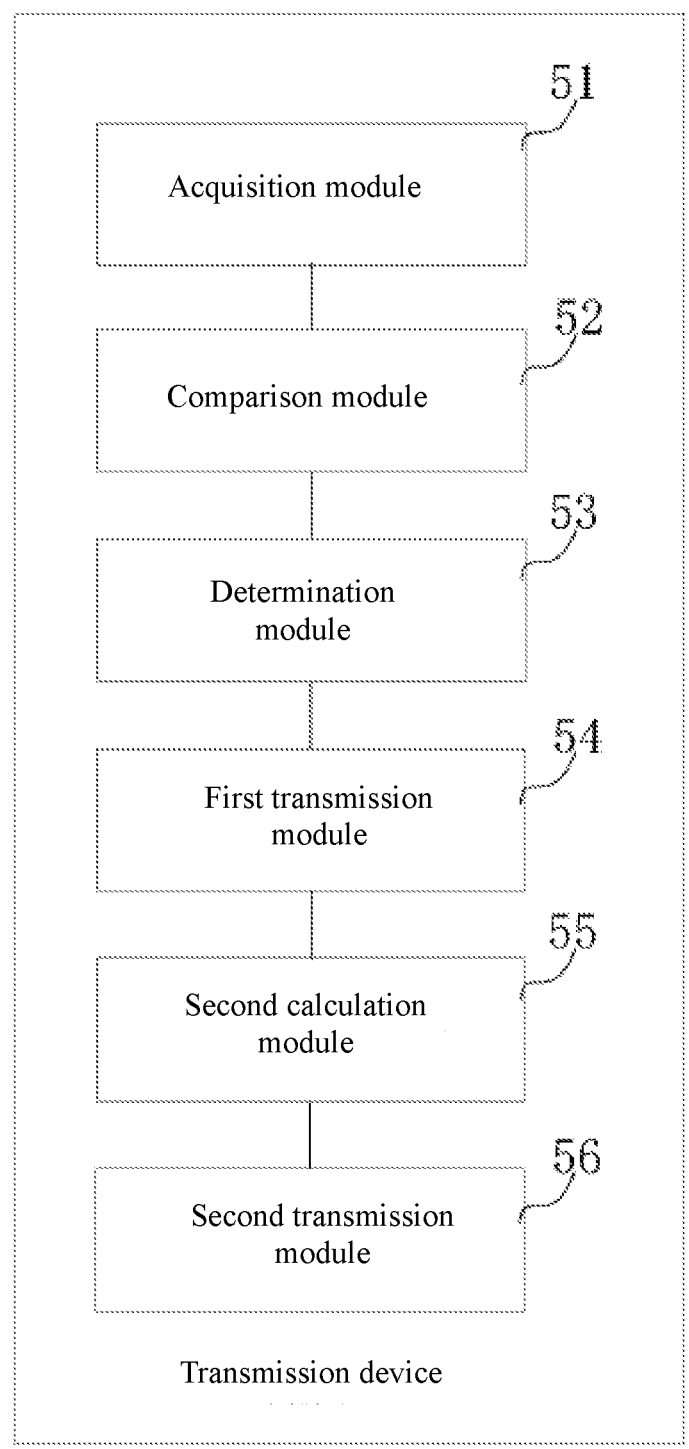
FIG. 13 is a schematic module diagram of a further network data transmission device according to an embodiment of the present invention.

Referring to FIG. 13, FIG. 13 illustrates a further network data transmission device. The device provided in this embodiment can avoid wasting the data traffic of a client terminal and reduce the time to transmit a network request to a server by the client terminal, thus improving the speed at which the client terminal accesses the network, and the device includes:

an acquisition module 51 configured to acquire a network request;

a comparison module 52 configured to compare the network request with a network request template pre-stored on a client terminal to obtain discrepant data and identical data;

a determination module 53 configured to determine position information of the discrepant data and the identical data in the network request template;

a first transmission module 54 configured to transmit to a server identification information of the network request template, the discrepant data and the position information, where the identification information will be used to search for, by the server, the network request template pre-stored on the server and corresponding to the identification information, and the network request template, the discrepant data and the position information will be used to restore, by the server, the network request;

a second calculation module 55 configured to calculate data in the network request by using the preset algorithm to obtain an authentication code; and a second transmission module 56 configured to transmit to the server the authentication code.

In the embodiment shown in FIG. 13, the functions of the transmission device provided in this embodiment correspond to those implemented in Embodiment 1, and thus reference can be made to the contents in Embodiment 1 for the functions of respective modules in this embodiment, which are not repeated herein one by one.

Embodiment 14

Figure 14:
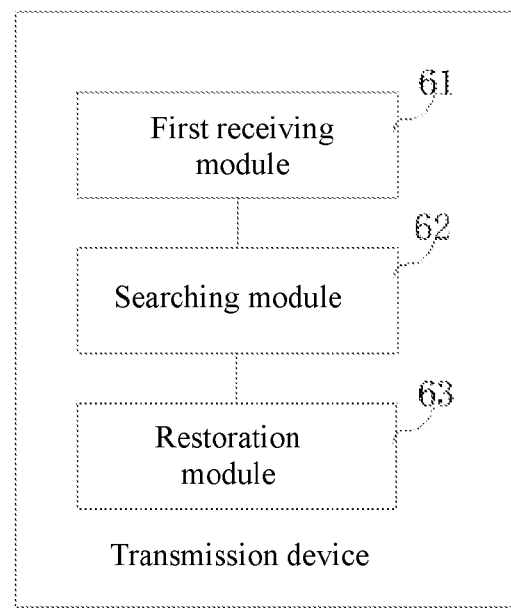
FIG. 14 is a schematic module diagram of a further network data transmission device according to an embodiment of the present invention.

Referring to FIG. 14, FIG. 14 illustrates a further network data transmission device. The device provided in this embodiment can avoid wasting the data traffic of a client terminal and reduce the time to transmit a network request to a server by the client terminal, thus improving the speed at which the client terminal accesses the network. The device includes:

a first receiving module 61 configured to receive identification information of a network request template, discrepant data and position information transmitted by a client terminal, wherein the discrepant data and identical data are obtained by the client terminal after comparing an acquired network request with the network request template stored therein, and the position information is determined by the client terminal according to positions of the discrepant data and the identical data in the network request template;

a searching module 62 configured to search for the network request template corresponding to the identification information; and a restoration module 63 configured to restore the network request according to the network request template, the discrepant data and the position information.

In the embodiment shown in FIG. 14, the functions of the transmission device provided in this embodiment correspond to those implemented in Embodiment 5, and thus reference can be made to the contents in Embodiment 5 for the functions of respective modules in this embodiment, which are not repeated herein one by one.

Embodiment 15

Figure 15:
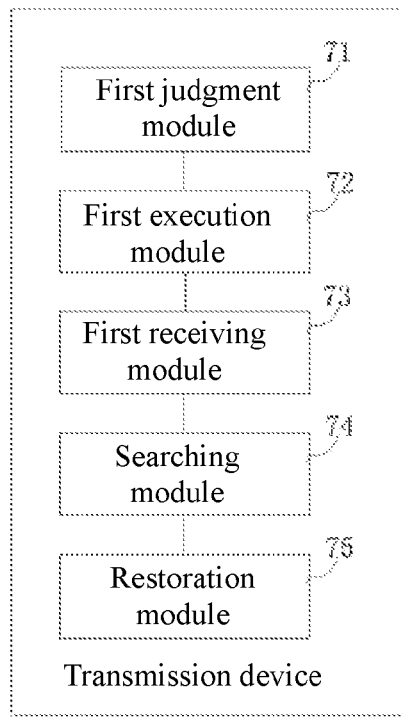
FIG. 15 is a schematic module diagram of a further network data transmission device according to an embodiment of the present invention.

Referring to FIG. 15, FIG. 15 illustrates a further network data transmission device; according to the device provided in this embodiment, in the case that identification information merely containing a network request template is received, it is only needed to find a network request template corresponding to the identification information and take the network request template as a network request, thus greatly shortening the time to receive data transmitted by a client terminal to a server, and the device includes:

a first judgment module 71 configured to judge whether or not received data transmitted by a client terminal merely contains identification information of a network request template;

a first execution module 72 configured to, when the received data transmitted by the client terminal merely contains the identification information of the network request template, determine a network request template corresponding to the identification information, and take the network request template as a network request; and when the received data transmitted by the client terminal does not merely contain the identification information of the network request template, continue to execute the first receiving module;

a first receiving module 73 configured to receive the identification information of the network request template, discrepant data and position information transmitted by the client terminal, wherein the position information is determined by the client terminal according to position information of the discrepant data and identical data in the network request template, the discrepant data and the identical data are obtained by the client terminal after comparing a network request with the network request template, and the network request is generated by the client terminal;

a searching module 74 configured to search for a network request template corresponding to the identification information; and a restoration module 75 configured to restore the network request according to the network request template, the discrepant data and the position information.

In the embodiment shown in FIG. 15, the functions of the transmission device provided in this embodiment correspond to those implemented in Embodiment 6, and thus reference can be made to the contents in Embodiment 6 for the functions of respective modules in this embodiment, which are not repeated herein one by one.

Embodiment 16

Figure 16:
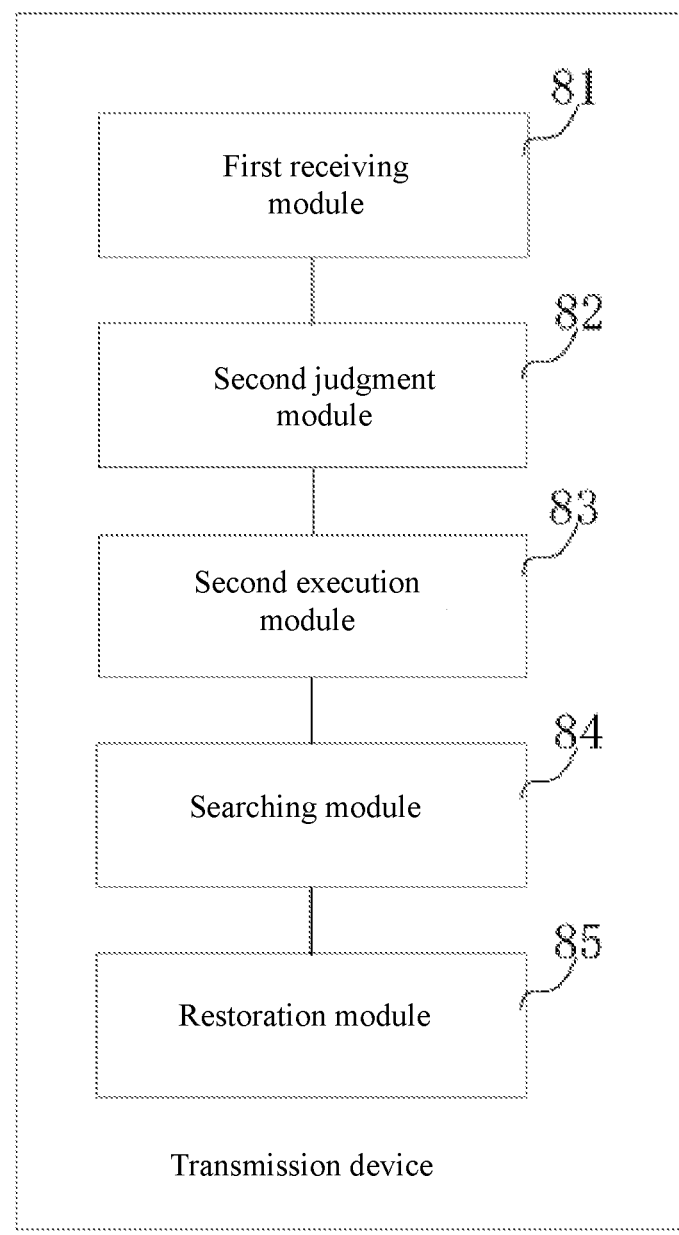
FIG. 16 is a schematic module diagram of a further network data transmission device according to an embodiment of the present invention.

Referring to FIG. 16, FIG. 16 illustrates a further network data transmission device; according to the device provided in this embodiment, in the case that a server has not found a network request template corresponding to identification information, a client terminal is required to retransmit complete network data, to avoid that an error occurs again in a transmission process. The device includes:

a first receiving module 81 configured to receive identification information of a network request template, discrepant data and position information transmitted by a client terminal, wherein the position information is determined by the client terminal according to position information of the discrepant data and identical data in the network request template, the discrepant data and the identical data are obtained by the client terminal after comparing a network request with the network request template, and the network request is generated by the client terminal;

a second judgment module 82 configured to judge whether or not a network request template corresponding to the identification information is found;

a second execution module 83 configured to, when the network request template corresponding to the identification information is found, continue to execute a determination module 84; and when the network request template corresponding to the identification information is not found, transmit to the client terminal a retransmission instruction;

a searching module 84 configured to search for the network request template corresponding to the identification information; and a restoration module 85 configured to restore a network request according to the network request template, the discrepant data and the position information.

In the embodiment shown in FIG. 16, the functions of the transmission device provided in this embodiment correspond to those implemented in Embodiment 7, and thus reference can be made to the contents in Embodiment 7 for the functions of respective modules in this embodiment, which are not repeated herein one by one.

Embodiment 17

Figure 17:
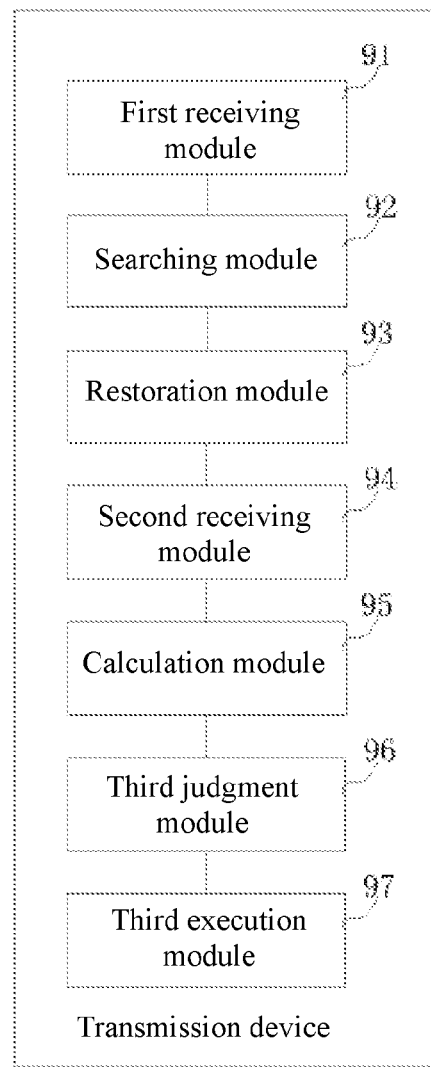
FIG. 17 is a schematic module diagram of a further network data transmission device according to an embodiment of the present invention.

Referring to FIG. 17, FIG. 17 illustrates a further network data transmission device. The device provided in this embodiment can authenticate whether data transmitted to a server by a client terminal is correct, if no, it indicates that the transmitted data is flawed and the client terminal is required to retransmit complete network data. The device includes:

a first receiving module 91 configured to receive identification information of a network request template, discrepant data and position information transmitted by a client terminal, wherein the position information is determined by the client terminal according to position information of the discrepant data and identical data in the network request template, the discrepant data and the identical data are obtained by the client terminal after comparing a network request with the network request template, and the network request is generated by the client terminal;

a searching module 92 configured to search for the network request template corresponding to the identification information;

a restoration module 93 configured to restore the network request according to the network request template, the discrepant data and the position information;

a second receiving module 94 configured to receive an authentication code transmitted by the client terminal, wherein the authentication code is obtained by the client terminal by using a preset algorithm to calculate data in the network request;

a calculation module 95 configured to calculate the data in the restored network request by using the preset algorithm to obtain an information code;

a third judgment module 96 configured to judge whether or not the authentication code is identical to the information code; and a third execution module 97 configured to, when the authentication code is identical to the information code, display that the restored network request is correct; and when the authentication code is not identical to the information code, transmit to the client terminal a retransmission instruction.

In the embodiment shown in FIG. 17, the functions of the transmission device provided in this embodiment correspond to those implemented in Embodiment 8, and thus reference can be made to the contents in Embodiment 8 for the functions of respective modules in this embodiment, which are not repeated herein one by one.

Embodiment 18

Figure 18:
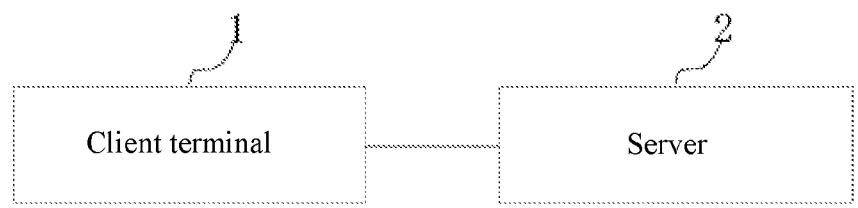
FIG. 18 is a schematic module diagram of a network data transmission system according to an embodiment of the present invention.

Referring to FIG. 18, FIG. 18 illustrates a network data transmission system. The device provided in this embodiment can avoid wasting the data traffic of a client terminal and reduce the time to transmit a network request to a server by the client terminal, thus improving the speed at which the client terminal accesses the network, and the system includes a client terminal 1 and a server 2; wherein, the client terminal 1 is configured to acquire a network request generated by the client terminal; compare the network request with a pre-stored network request template to obtain discrepant data and identical data; determine position information of the discrepant data and the identical data in the network request template; and transmit to a server identification information of the network request template, the discrepant data and the position information; and the server 2 is configured to receive the identification information of the network request template, the discrepant data and the position information transmitted by the client terminal; search for the network request template corresponding to the identification information; and restore the network request according to the network request template, the discrepant data and the position information.

In the embodiment shown in FIG. 18, the functions of the transmission system provided in this embodiment respectively correspond to those implemented in Embodiment 1 and Embodiment 5, and thus reference can be made to the contents in Embodiment 1 and Embodiment 5 for the functions of respective modules in this embodiment, which are not repeated herein one by one.

It should be noted that the embodiments shown in FIG. 1 to FIG. 18 are merely preferred embodiments introduced in the present invention, and persons skilled in the art, on this basis, can fully design more embodiments, which are thus not repeated herein.

Apparently, persons skilled in the art should understand that the aforementioned respective modules or respective steps of the present invention can be implemented using a general computing device. They may be integrated onto a single computing device or distributed on a network formed by multiple computing devices. Optionally, they may be implemented using program code that can be executed by the computing device, and so, they can be stored in a storage device to be executed by the computing device. Under some circumstances, it is feasible to execute the illustrated or described steps in a sequence different from that herein, or they are respectively made into respective integrated circuit modules, or multiple modules or steps in them are made into a single integrated circuit module for implementation. In this way, the present invention is not limited to any particular combination of hardware and software.

The above are merely preferred embodiments of the present invention, but are not used to limit the present invention. For persons skilled in the art, the present invention may have a variety of alterations and changes. Any modification, equivalent replacement, improvement and the like within the spirit and principle of the present invention should be included in the protection scope of the present invention.

The invention claimed is:

1. A network data transmission method, comprising:
acquiring a network request;
determining whether the network request is identical to a network request template pre-stored on a client terminal;
when the network request is determined to be identical to the network request template, transmitting identification information of the network request template to a server; and
when the network request is determined to be not identical to the network request template,
    comparing the network request with the network request template to obtain discrepant data and identical data;
    determining position information of the discrepant data and the identical data in the network request template; and
    transmitting to the server the identification information of the network request template, the discrepant data and the position information, wherein the identification information is used to search for, by the server, the network request template pre-stored on the server and corresponding to the identification information, and the network request template, the discrepant data and the position information are used to restore, by the server, the network request.

2. The network data transmission method according to claim 1, wherein, before the comparing the network request with a network request template to obtain discrepant data and identical data, the method further comprises:
calculating a data amount of discrepant data of the network request with respect to each network request template in a template group; and
selecting in the template group a network request template of which the data amount is minimum.

3. The network data transmission method according to claim 2, wherein, after the acquiring a network request and before the calculating a data amount of discrepant data of the network request with respect to each network request template in a template group, the method further comprises:
deleting a network request template in the template group of which storage time exceeds a preset time.

4. The network data transmission method according to claim 1, wherein, after the transmitting to a server identification information of the network request template, the discrepant data and the position information, the method further comprises:
determining whether a retransmission instruction transmitted by the server is received; and
when the retransmission instruction transmitted by the server is received, transmitting to the server the network request.

5. The network data transmission method according to claim 1, wherein the identification information is obtained by using a preset algorithm to calculate data in the network request template; and
after the acquiring a network request, the method further comprises:
calculating data in the network request by using the preset algorithm to obtain an authentication code; and
transmitting to the server the authentication code.

6. A network data transmission device, comprising:
one or more processors; and
a memory storing instructions, when executed by the one or more processors, configured to cause the one or more processors to:
acquire a network request;
determine whether the network request is identical to a network request template pre-stored on a client terminal;
when the network request is determined to be identical to the network request template, cause identification information of the network request template to be transmitted to a server; and
when the network request is determined to be not identical to the network request template,
    compare the network request with the network request template to obtain discrepant data and identical data;
    determine position information of the discrepant data and the identical data in the network request template; and
    cause the identification information of the network request template, the discrepant data and the position information to be transmitted to the server, wherein the identification information is used to search for, by the server, the network request template pre-stored on the server and corresponding to the identification information, and the network request template, the discrepant data and the position information are used to restore, by the server, the network request.

7. The network data transmission device according to claim 6, wherein the instructions are further configured to cause the one or more processors to:
calculate a data amount of discrepant data of the network request with respect to each network request template in a template group comprising multiple network request templates; and
select in the template group a network request template of which the data amount is minimum.

8. The network data transmission device according to claim 7, wherein the instructions are further configured to cause the one or more processors to delete a network request template in the template group of which storage time exceeds a preset time.

9. The network data transmission device according to claim 6, wherein the instructions are further configured to cause the one or more processors to:
determine whether a retransmission instruction transmitted by the server is received; and
when the retransmission instruction transmitted by the server is received, cause the network request to be transmitted to the server.

10. The network data transmission device according to claim 6, wherein the instructions are further configured to cause the one or more processors to:
calculate data in the network request by using a preset algorithm to obtain an authentication code; and
cause the authentication code to be transmitted to the server.

11. A network data transmission method, comprising:
acquiring a network request;
calculating a data amount of discrepant data of the network request with respect to each network request template in a template group;
selecting in the template group a network request template of which the data amount is minimum;
comparing the network request with the selected network request template to obtain discrepant data and identical data;
determining position information of the discrepant data and the identical data in the selected network request template; and
transmitting to a server identification information of the selected network request template, the discrepant data and the position information, wherein the identification information is used to search for, by the server, the network request template pre-stored on the server and corresponding to the identification information, and the network request template, the discrepant data and the position information are used to restore, by the server, the network request.

12. The network data transmission method according to claim 11, wherein, after the acquiring a network request and before the calculating a data amount of discrepant data of the network request with respect to each network request template in a template group, the method further comprises:
deleting a network request template in the template group of which storage time exceeds a preset time.

13. The network data transmission method according to claim 11, wherein, after the transmitting to a server identification information of the selected network request template, the discrepant data and the position information, the method further comprises:
determining whether a retransmission instruction transmitted by the server is received; and
when the retransmission instruction transmitted by the server is received, transmitting to the server the network request.

14. The network data transmission method according to claim 11, wherein the identification information is obtained by using a preset algorithm to calculate data in the network request template; and
after the acquiring a network request, the method further comprises:
calculating data in the network request by using the preset algorithm to obtain an authentication code; and
transmitting to the server the authentication code.

15. A network data transmission device, comprising:
one or more processors; and
a memory storing instructions, when executed by the one or more processors, configured to cause the one or more processors to:
acquire a network request;
calculate a data amount of discrepant data of the network request with respect to each network request template in a template group;
select in the template group a network request template of which the data amount is minimum;
compare the network request with the selected network request template to obtain discrepant data and identical data;
determine position information of the discrepant data and the identical data in the selected network request template; and
cause identification information of the selected network request template, the discrepant data and the position information to be transmitted to a server, wherein the identification information is used to search for, by the server, the network request template pre-stored on the server and corresponding to the identification information, and the network request template, the discrepant data and the position information are used to restore, by the server, the network request.

16. The network data transmission device according to claim 15, wherein the instructions are further configured to cause the one or more processors to delete a network request template in the template group of which storage time exceeds a preset time.

17. The network data transmission device according to claim 15, wherein the instructions are further configured to cause the one or more processors to:
determine whether a retransmission instruction transmitted by the server is received; and
when the retransmission instruction transmitted by the server is received, cause the network request to be transmitted to the server.

18. The network data transmission device according to claim 15, wherein the instructions are further configured to cause the one or more processors to:
calculate data in the network request by using a preset algorithm to obtain an authentication code; and
cause the authentication code to be transmitted to the server.

* * * * *